United States Patent [19]
Gates

[11] 4,342,367
[45] Aug. 3, 1982

[54] FOLDING TOOL BAR

[75] Inventor: Donald C. Gates, Fargo, N. Dak.

[73] Assignee: Alloway Manufacturing, Inc., Fargo, N. Dak.

[21] Appl. No.: 199,356

[22] Filed: Oct. 21, 1980

[51] Int. Cl.² ............................................. A01B 73/00
[52] U.S. Cl. ...................... 172/776; 74/102; 172/311; 403/55; 403/119
[58] Field of Search ............... 172/311, 456, 446, 662, 172/776; 74/98, 99 R, 102, 109; 403/53, 55, 62, 118, 119, 161, 162, 163; 16/156, 163, 173

[56] References Cited
U.S. PATENT DOCUMENTS

| | | | |
|---|---|---|---|
| 83,062 | 10/1868 | Hover | 16/163 |
| 632,771 | 9/1899 | Wheeler | 74/102 |
| 1,689,664 | 10/1928 | Covell | 16/163 |
| 1,693,992 | 12/1928 | Peterson | 16/163 |
| 2,701,656 | 2/1955 | French | 74/98 X |
| 3,107,735 | 10/1963 | Mellen | 74/99 X |
| 3,774,693 | 11/1973 | Orthman | 172/311 |
| 3,941,194 | 3/1976 | Orthman | 172/311 |
| 4,171,726 | 10/1979 | Ward | 172/456 |

Primary Examiner—Richard T. Stouffer
Attorney, Agent, or Firm—Henderson & Sturm

[57] ABSTRACT

A folding tool bar apparatus for a farm implement having a hollow main frame and winged sections pivotally attached to each end thereof. The winged sections are pivotal between a first horizontally extended position and a second folded horizontal position above the hollow main frame and disposed 180° from the first position. An actuation structure is provided for moving the winged section between the first and second positions and this actuation structure includes the first set of teeth attached to each end of the hollow main frame and the second set of teeth attached to each end of the winged section for meshing with the teeth on the ends of the hollow main frame. The bracket structure is pivotally attached to the first and second set of teeth on each end of the main frame and a lever arm is attached to the bracket. The hydraulic cylinder is disposed in the hollow main frame and is attached to the lever arm for moving the lever arm between the first position corresponding to the first position of the winged sections and a second position corresponding to the second position of the winged sections.

11 Claims, 7 Drawing Figures

FOLDING TOOL BAR

BACKGROUND OF THE INVENTION

The present invention relates generally to folding tool bars for farm implements, and more particularly the type of folding tool bar in which the wing sections move from a horizontal working position to a horizontal transport position, in which latter position the wing sections extend over the main frame of the tool bar.

In the design and manufacture of tool bars for attaching farm implements thereto, a main consideration is to make the tool bar as long as is practical. There are many factors which limit the practical length for such tool bars and these include the factor of having a tool bar which is narrow enough to be transported on public roads. Another factor which limits the length of the tool bar is the rigidity thereof, since if a tool bar is too long, it simply cannot be held in a rigid fashion under certain conditions.

Certain designs have been invented and manufactured for the purpose of overcoming the above disadvantages as well as others. In general, these solutions tend to be very complex, with the accompanying disadvantage that manufacturing cost are increased and dependability is compromised. Still another problem with the complex devices of the prior art for folding tool bars in order to make them commercially feasible is to add complicated folding structures along the length of the tool bar, and these structures merely get in the way of the main purpose of the tool bar, which is to attach implements thereto, such as ground working tools, planters, etc.

Consequently, there is a definite need for structures which overcome the above delineated deficiencies in the prior art.

SUMMARY OF THE INVENTION

The present invention relates to a folding tool bar apparatus for a farm implement or the like having a main hollow frame adapted for attachment to the back of a prime mover, such as a farm tractor. A winged section is pivotally attached to each end of the hollow main frame and each of these winged sections is pivotally movable from the first horizontally extending earth working position to a second folded horizontal position above the main hollow frame. Actuation structures are provided for moving the winged sections between the first and second positions thereof. The actuation mechanism includes a first set of teeth attached to each end of the hollow main frame and a second set of teeth attached to each of the end winged sections where they are pivotally attached to the main frame, for the purpose of meshing with the first set of teeth. A bracket is provided and is pivotally attached to the first and second teeth. A lever arm is attached to the bracket and a mechanism is provided inside of the hollow main frame for moving the lever arm between a first position corresponding to the first position of the winged section and to a second position corresponding to the second position of the winged section. The meshing teeth tend to amplify movement of the winged section as it moves between these positions as compared to merely a single pivotal attachment between the end of the hollow main frame and the winged section.

An object of the present invention is to provide an improved folding tool bar.

Another object of the invention is to provide a folding tool bar which is simple and economical to construct, but is dependable in its use.

A further object of the invention is to eliminate structures on the outside of a folding tool bar structure which would interfere with the main purpose of a tool bar, the main purpose of which is to attach implements or tools thereto.

Still another object of the present invention is to provide a way to amplify pivotal movement of the winged section of a tool bar between the transport position and the working position thereof.

Other objects, advantages, and novel features of the present invention will become apparent from the following detailed description of the invention when considered in conjunction with the accompanying drawings.

DESCRIPTION OF THE PREFERRED EMBODIMENT

Figure 1:
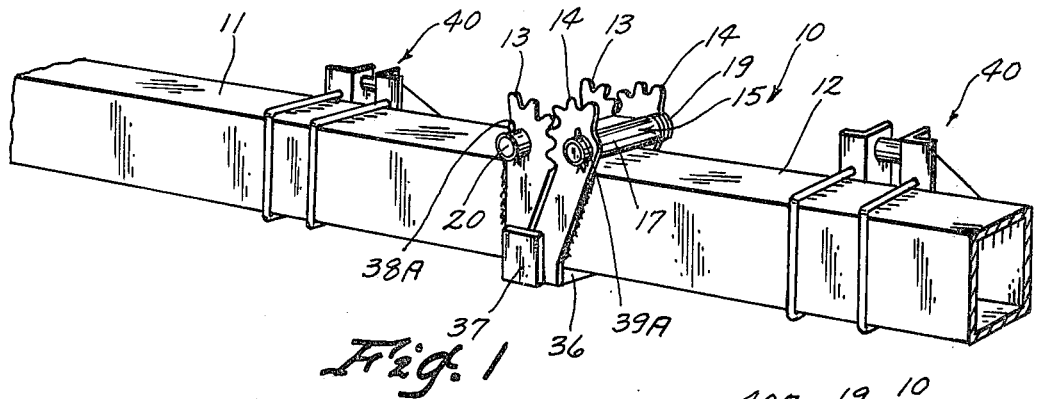
FIG. 1 is a partial perspective view of a tool bar constructed in accordance with the present invention.

Referring now to the drawings wherein like reference numerals designate identical or corresponding parts throughout the several views, FIG. 1 shows a folding tool bar apparatus 10 constructed in accordance with the present invention. The main frame 11 can be connected to a prime mover such as a tractor in one of many ways; for example, by attaching it to the three point hitch of a tractor, a two point hitch of a tractor, or by trailing it like a trailer, for example as shown in U.S. Pat. No. 3,774,693, which patent is incorporated herein by reference. As can be readily seen by looking at FIGS. 2–4, the main frame 11 is a hollow square tubular structure. A winged section 12, which is typically constructed of the identical type of tubing as in the main hollow frame 11, is pivotally attached to each end of the main frame 11, although only one end of the main frame 11 is shown in the drawings.

A first pair of teeth 13 are rigidly attached to one end of the main frame 11, for example by welding. A second set of teeth 14 are rigidly attached to each end of the winged section 12, also preferably by welding, although it is to be understood that other types of connections are fully equivalent thereto. A bracket structure 15 is used to pivotally connect the winged section 12 to the main frame 11. This bracket 15 includes a member 16 connecting together a pair of tubular members 17 and 18. These members 17 and 18 have a pin 19 and 20, respectively, extending therethrough. A reinforcement member 21 is also connected between the tubular members 17 and 18, and this reinforcement member 21 has lever 22 rigidly attached thereto. The lever has a further reinforcement member 23 attached thereto.

A hydraulic cylinder 24 is disposed within the main frame 11 and is of a size to fit fairly snugly within the main frame 11. One of the advantages of the present invention is that a very large hydraulic cylinder can be used, since the cylinder does not need to be pivoted as in the prior art; for example, as shown in U.S. Pat. No. 3,774,693.

A plate 26 is rigidly attached to and extends through the main frame 11 and has an opening therethrough for reception of a pin 27 which extends also through a clevis 28 on hydraulic cylinder 24. Another clevis 29 on the other end of hydraulic cylinder 24 attaches to a linkage member 30 having a pair of guide members 31 welded to each side thereof for guiding the linkage 30 along the inside of the main frame 11. A pin 32 extends through the clevis 29 and through the linkage member 30 for positively connecting the hydraulic cylinder 24 to the linkage member 30. Still another pin 33 extends through and pivotally attaches the lever arm 22 to the linkage member 30 for providing the necessary pivotal attachment between these two members.

Figure 3:
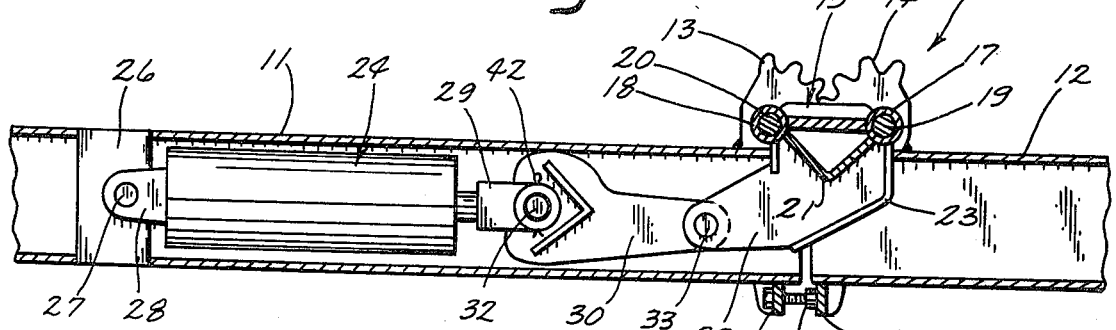
FIG. 3 is an enlarged cross-sectional view taken along line 3—3 of FIG. 2.
Figure 4:
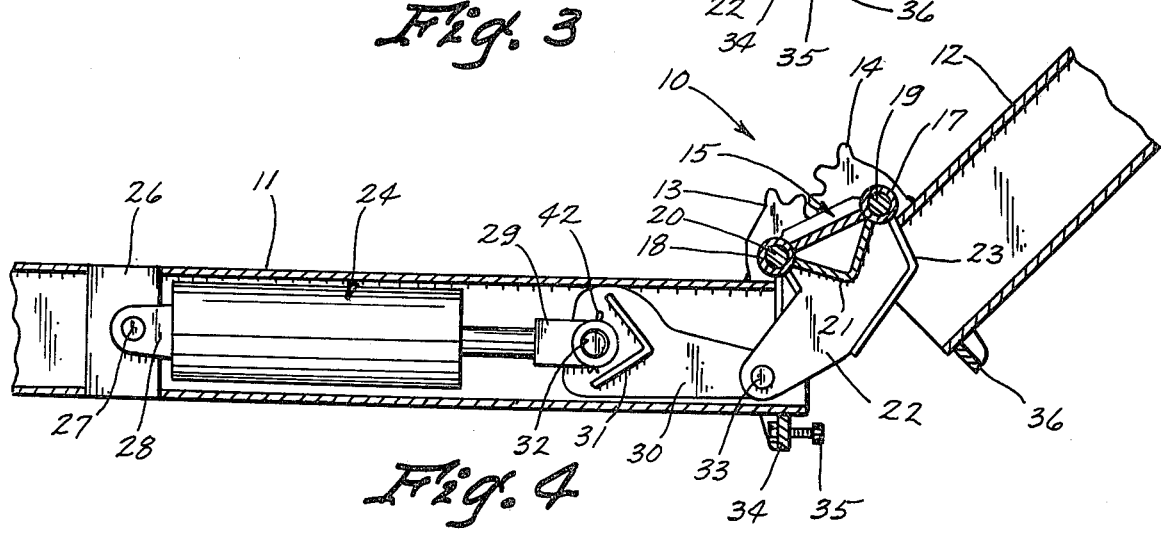
FIG. 4 is a view, like FIG. 3, but showing the apparatus moving between the working horizontal position of FIG. 3 and the ultimate transport position thereof.
Figure 5:
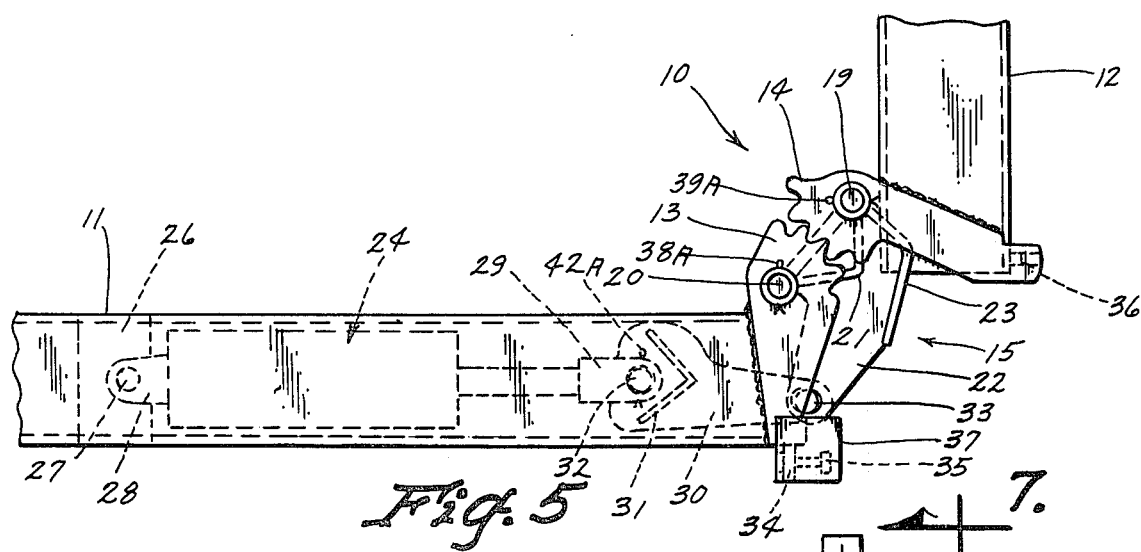
FIG. 5 is a side elevational view similar to the cross-sectional views of FIGS. 3 and 4 and showing a still further progression of the movement of the winged section of the folding tool bar as it moves from the working horizontal position thereof to the horizontal transport position thereof.

Referring now to FIGS. 3 and 4, it can be seen that a member 34 is rigidly attached to the main frame 11 and to each side of the lower portion of the teeth 13 for receiving and adjusting bolt 35 therethrough. A member 36 similar to the member 34, is also rigidly attached to the winged section 12 and to the lower portion of the teeth member 14. The members 34, 35 and 36 provide for a stop adjustment mechanism. If it is desired to let the winged section 12 down with respect to the main frame 11, then the bolt 35 would be screwed such that it would move to the left and allow the winged section 12 to pivot downwardly. If the reverse adjustment is necessary, the bolt 35 would be rotated such that it would move to the right and cause the wing section to be prevented from moving downwardly beyond whatever point is set. Typically, this adjustment screw 35 is preset precisely in the position shown in FIG. 3 whereby the wing section 12 is aligned exactly with the main frame member 11. A guard 37 is rigidly attached to the member 13, for example as shown in FIG. 1, to support the winged section 12 and prevent it from bending back at the hinge with respect to the main frame 11 and the winged section 12.

In operation, the present invention would be used by attaching main tool bar 11 to a farm tractor or the like and connecting appropriate hydraulic hoses up to the hydraulic cylinders 24. Tool clamps 40, which are well-known in this art, would be utilized to attach earth working tools or the like to the tool bar sections 11 and 12 at whatever intervals are desired. Then when it is time to drive the tractor with the tool bar and implements attached thereto to the field, the hydraulic cylinder 24 would be lengthened from the position shown in FIGS. 1-3 to the extended position shown in FIG. 6, such that the winged sections 12 are folded over the top of the main frame 11. Once this is done, then the tractor and implement can be driven on public roads and through gates without fearing that the implement will be too wide. Once the implement and tractor are in the field, then the hydraulic controls will be actuated, in the usual fashion, to retract the hydraulic cylinder 24 from the position shown in FIG. 6 to the positions shown in FIG. 3. Whereby the winged section 12 will be moved to the horizontal working position, for example as shown in FIG. 1.

Figure 2:
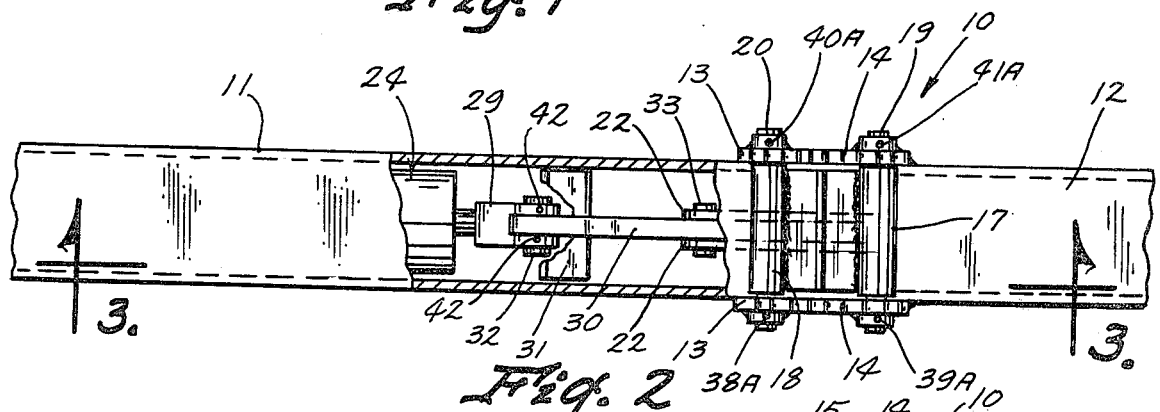
FIG. 2 is a top plan view of the apparatus shown in FIG. 1 and having a portion thereof broken away to show the interior thereof.
Figure 6:
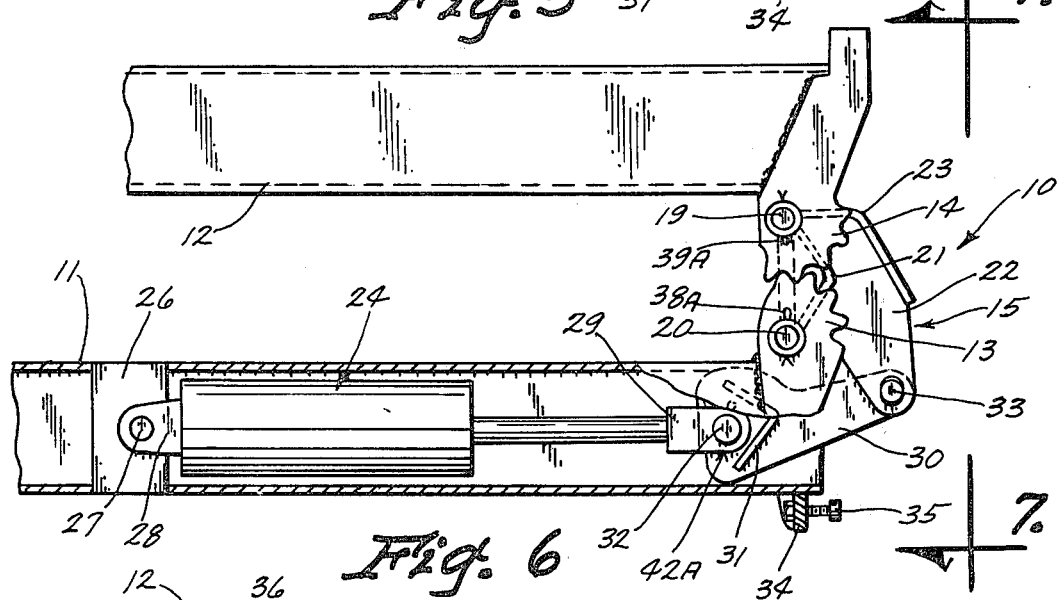
FIG. 6 shows a view like FIG. 5 showing portions of the main hollow frame broken away and also showing the transport position of the winged section relative to the main frame thereof.
Figure 7:
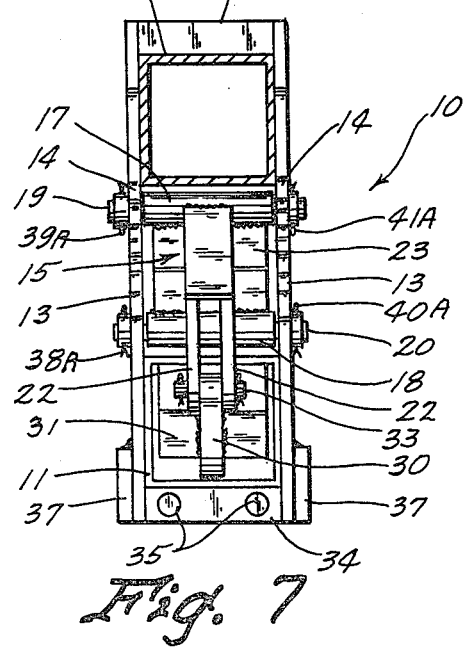
FIG. 7 shows an end view of the apparatus of FIG. 6 taken along line 7—7 of FIG. 6.

In this movement of the winged sections 12 between the positions shown in FIGS. 1-3 and the position shown in FIG. 6, it should be noted that the meshing of the teeth 13 with the teeth 14 causes an amplification of the movement of the winged section 12 which would not occur if only a single pivotal attachment were used. For example, this can be seen in U.S. Pat. No. 3,774,693 wherein actuation of a hydraulic cylinder results in only 90° movement of the winged sections of a folding tool bar, as distinguished from the 180° movement of the present invention.

Accordingly, it can be appreciated that all of the objects referred to above have been satisfied with the preferred embodiment shown in the drawings. Obviously, many modifications and variations of the present invention are possible in light of the above teachings. For example, the hydraulic cylinder actuation structure shown herein could be replaced by any other structure within tool bar 11 which would move the clevis 29 between the positions shown in FIG. 3 and the position shown in FIG. 6. It is therefore to be understood that, within the scope of the appended claims, the invention may be practiced otherwise then as specifically described herein.

I claim:

1. A folding tool bar apparatus for a farm implement or the like comprising:

a hollow main frame;

a wing section pivotally attached to one end of said hollow main frame between a first horizontally extending position and a second folded horizontal position; and actuation means for moving said wing section between said first and second positions, said actuation means comprising:

first teeth means attached to said hollow main frame, second teeth means attached to said wing section for meshing with the first teeth means, bracket means pivotally attached to said first and second teeth means, a lever arm attached to said bracket means, power means disposed at least partially within hollow main frame means for moving said lever arm between a first position, corresponding to the first position of said wing section, wherein the power means is disposed within said main frame, to a second position corresponding to the second position of said wing section, said power means comprising a hydraulic cylinder disposed within said hollow main frame and attached to said main frame and pivotally attached to said lever arm, and wherein said first teeth means includes a first pair of plates, having teeth thereon, rigidly attached to one end of said hollow main frame and having a first pivot pin means interconnecting said first pair of plates; and wherein said second teeth means includes a second pair of plates, having teeth thereon, rigidly attached to one end of said wing section and having a second pivot pin means interconnecting said second pair of plates, the first and second pivot pin means being for facilitating the pivotal connection between the bracket means and the first and second teeth means.

2. The apparatus of claim 1 including stop means on the hollow main frame and the wing section for preventing the wing section from moving beyond the first position thereof.

3. The apparatus of claim 2 wherein said stop means are adjustable for adjusting the relative position of the main frame and the wing section in the second position of the wing section.

4. The apparatus of claim 3 wherein the first pivot pin is disposed above said hollow main frame and said stop means include a portion on the lower part of the hollow main frame.

5. The apparatus of claim 4 wherein said hydraulic cylinder is substantially the same size as the hollow portion of the main frame in which it is disposed for substantially preventing rotation of the hydraulic cylinder about the connection thereof to the hollow main frame.

6. Apparatus as defined in claim 5 including a second wing section pivotally attached to the other end of said hollow main frame and having a second actuation means connected thereto which is substantially identical to the first said actuation means.

7. A folding tool bar apparatus for a farm implement or the like comprising:
a hollow main frame;
a wing section pivotally attached to one end of said hollow main frame between a first horizontally extending position and a second folded horizontal position; and
actuation means for moving said wing section between said first and second positions, said actuation means comprising:
 first teeth means attached to said hollow main frame,
 second teeth means attached to said wing section for meshing with the first teeth means,
 bracket means pivotally attached to said first and second teeth means,
 a lever arm attached to said bracket means, and
 power means disposed at least partially within said hollow main frame means for moving said lever arm between a first position, corresponding to the first position of said wing section, wherein the power means is disposed within said main frame, to a second position corresponding to the second position of said wing section, said power means comprising:
 a hydraulic cylinder disposed within said main frame and operatively attached at one end thereof to said main frame;
 a linkage member disposed at least partially within said main frame and being pivotally attached at one end thereof to the other end of said hydraulic cylinder, said linkage member including guide means thereon for following the inside of the main frame for preventing rotation of said hydraulic cylinder, the other end of said linkage member being pivotally attached to said lever arm.

8. The apparatus of claim 7 wherein said guide means comprises a rounded extention of said linkage member on one side of the pivotal connection of the hydraulic cylinder and said linkage member and a rounded portion on the other side of the pivotal connection of the hydraulic cylinder and said linkage member, said rounded extension and rounded portion being spaced apart sufficiently to remain in close tolerence with the hollow interior of the main frame thereby preventing rotation of the hydraulic cylinder.

9. The apparatus of claim 8 wherein said linkage member includes means for allowing it to pivot in the direction of the wing member about its pivotal connection to the hydraulic cylinder as the hydraulic cylinder is lengthened.

10. The apparatus as defined in claim 9 including means on said linkage member to prevent said linkage member from pivoting in the other direction when said hydraulic cylinder is being lengthened.

11. A folding tool bar apparatus for a farm implement or the like comprising:
a hollow main frame;
a wing section pivotally attached to one end of said hollow main frame between a first horizontally extending position and a second horizontal folded position; and
floating hinge point actuation means for moving said wing section between said first and second positions, said floating hinge point actuation means comprising:
first teeth means attached to said hollow main frame,
second teeth means attached to said wing section for meshing with the first teeth means,
bracket means pivotally attached to said first and second teeth means, the pivotal attachment of said bracket means to said first and second teeth means including a plurality of pivot means one of which is disposed between said main frame and said bracket means, and another of which is disposed between said wing section and said bracket means, for providing relative pivotal movement between the main frame, bracket means and wing section,
a lever arm spaced from said one and said another of said plurality of pivot means and attached to said bracket means, and
power means disposed at least partially within said hollow main frame means for moving said lever arm between a first position, corresponding to the first position of said wing section, wherein the power means is disposed within said main frame, to a second position corresponding to the second position of said wing section.

* * * * *